(12) United States Patent
Allen

(10) Patent No.: US 9,835,200 B2
(45) Date of Patent: Dec. 5, 2017

(54) GENERATOR BEARING ASSEMBLY AND A METHOD FOR LUBRICATING A GENERATOR BEARING ASSEMBLY

(71) Applicant: Siemens Energy, Inc., Orlando, FL (US)

(72) Inventor: David Thomas Allen, Longwood, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 35 days.

(21) Appl. No.: 14/687,105

(22) Filed: Apr. 15, 2015

(65) Prior Publication Data

US 2016/0305479 A1 Oct. 20, 2016

(51) Int. Cl.

| F16C 23/04 | (2006.01) |
|---|---|
| F16C 23/08 | (2006.01) |
| F16C 25/04 | (2006.01) |
| F16C 33/20 | (2006.01) |
| F16C 33/10 | (2006.01) |

(52) U.S. Cl.
CPC .......... *F16C 33/208* (2013.01); *F16C 23/045* (2013.01); *F16C 33/1095* (2013.01); *F16C 2208/32* (2013.01); *F16C 2223/42* (2013.01); *F16C 2240/06* (2013.01); *F16C 2240/60* (2013.01); *F16C 2380/26* (2013.01)

(58) Field of Classification Search
CPC ...... F16C 17/10; F16C 17/105; F16C 23/043; F16C 23/045; F16C 33/1095; F16C 33/205; F16C 33/206; F16C 33/208
See application file for complete search history.

(56) References Cited

U.S. PATENT DOCUMENTS

| 6,180,574 B1 * | 1/2001 | Ryan | F16C 33/201 106/287.24 |
|---|---|---|---|
| 6,863,994 B2 * | 3/2005 | Tanaka | F16C 33/201 384/276 |
| 8,034,865 B2 * | 10/2011 | Hamel | F16C 33/12 524/404 |
| 2009/0078080 A1 * | 3/2009 | Kemnitz | F16C 33/208 74/579 E |
| 2014/0153852 A1 * | 6/2014 | Long | F16C 17/14 384/129 |

* cited by examiner

*Primary Examiner* — James Pilkington

(57) ABSTRACT

A method for lubricating a generator bearing assembly is presented. The generator bearing assembly has a bearing and a bearing seat that supports the bearing. A coating of a lubricating material is applied at an interfacing surface between the bearing and the bearing seat. A curing process is performed to the coating by heating the coating up to a predefined curing temperature.

16 Claims, 5 Drawing Sheets

GENERATOR BEARING ASSEMBLY AND A METHOD FOR LUBRICATING A GENERATOR BEARING ASSEMBLY

FIELD

Aspects of the present invention relate to a generator bearing assembly and a method for lubricating a generator bearing assembly.

DESCRIPTION OF RELATED ART

A bearing assembly for a generator may comprise a bearing and a bearing seat which supports the bearing. The bearing seat may have, for example, a spherical shape. A spherical bearing seat may provide a self-alignment feature of a bearing assembly during generator operation.

During generator operation, a bearing assembly arrangement may vary due to weight of the bearing assembly components. The bearing assembly variations may shift loads that a spherical bearing seat supports. The load shifting may result in a high interfacing surface contact between a bearing and a bear seat, localized galling and disabling the spherical bearing seat from providing a self-alignment feature that was intended. This issue is identified as "tilting" of the bearing assembly.

The tilting issue of a bearing assembly may be resolved by performing a Blue & Scrape process to a spherical interfacing surface between the bearing and the spherical bearing seats. This process utilizes a Prussian Blue indicator that is applied to the desired profile of the interfacing surface for transfer to adjacent component interfacing surface for determination of fit. Interface surface of mating profile is scraped, as required, until matching profiles are determined to be within acceptable surface variation limits as interpreted from the impression left on adjacent mating surfaces by the Prussian Blue indicator. However, it has been found that the Blue and Scrape process may not provide a suitable solution to this issue. The tilting issue has reoccurred several times on various units that have a spherical interfacing surface between a bearing and a bearing seat using the Blue & Scrap process. In some cases, the Blue & Scrape process may have to be repeatedly performed which may add 60-100 hours of additional efforts to resolve the tilting issue of a bearing assembly. It may significantly increase maintenance cost of the customers. The Blue & Scrape process which is used in current industrial practice does not provide a reliable and simply solution to resolve the titling issue of a bearing assembly.

SUMMARY

Briefly described, aspects of the present invention relate to a generator bearing assembly and a method for lubricating a generator bearing assembly, the generator bearing assembly comprising a bearing and a bearing seat.

According to an aspect, a method for lubricating a generator bearing assembly comprises applying a coating of a lubricating material at an interfacing surface between a bearing and a bearing seat of the bearing assembly. The method further comprises performing a curing process to the coating by heating the coating up to a predefined curing temperature.

According to another aspect, a generator bearing assembly comprises a bearing and a bearing seat that supports the bearing. A coating of a lubricating material may be applied at an interfacing surface between the bearing and the bearing seat. A curing process may be performed to the coating by heating the coating up to a predefined curing temperature.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
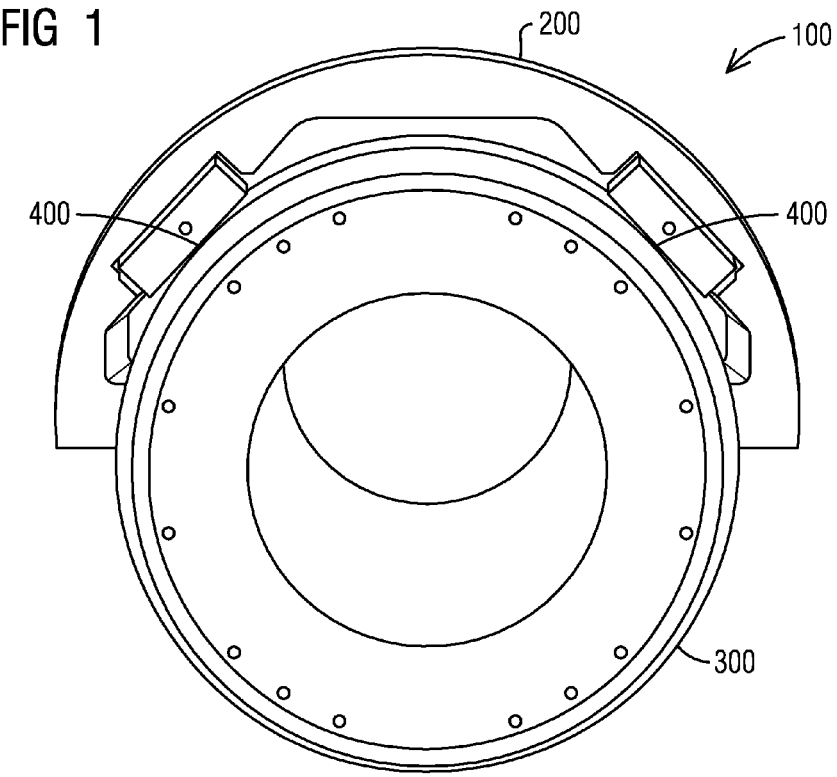
FIG. 1 illustrates a perspective view of a generator bearing assembly having a bearing seat and a bearing according to an embodiment.

FIG. 1 illustrates a perspective view of a generator bearing assembly 100 according to an embodiment. The generator bearing assembly 100 is illustrated in an upside down arrangement in FIG. 1. According to the illustrated embodiment, the generator bearing assembly 100 may comprise a bearing seat 200 and a bearing 300. The bearing 300 may be supported by the bearing seat 200. According to the illustrated embodiment, the bearing assembly 100 comprises interfacing surfaces 400 between the bearing seat 200 and the bearing 300. The interfacing surfaces 400 may support load introduced by weight of a component of the generator bearing assembly 100.

According to an embodiment, the interfacing surface 400 may be spherical shaped. Having spherical shaped interfacing surfaces 400 may provide a self-alignment feature for the bearing assembly 100. A layer may be applied to the interfacing surface 400 for an initial alignment. The layer may be applied using a Blue & Scrape process.

According to an embodiment, the interfacing surface 400 may comprise a concave shape or a convex shape.

Figure 2:
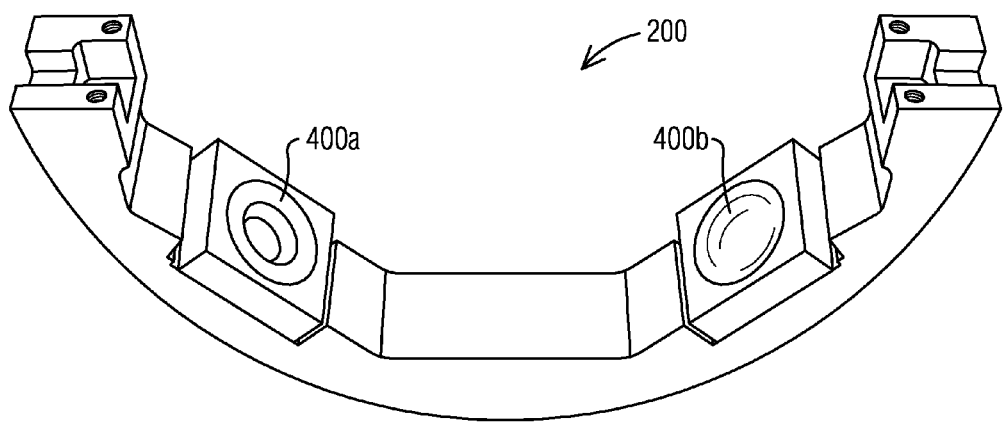
FIG. 2 illustrates a perspective view of a bearing seat according to an embodiment.

FIG. 2 illustrates a perspective view of a bearing seat 200 according to an embodiment. As illustrated in FIG. 2, the bearing seat 200 may comprise a concave shape interfacing surface 400a and a concave shape interfacing surface 400b. The concave shape interfacing surface 400a and the concave shape interfacing surface 400b may support load introduced by weight of a component of the generator bearing assembly 100, for example, weight of a bearing 300.

Figure 3:
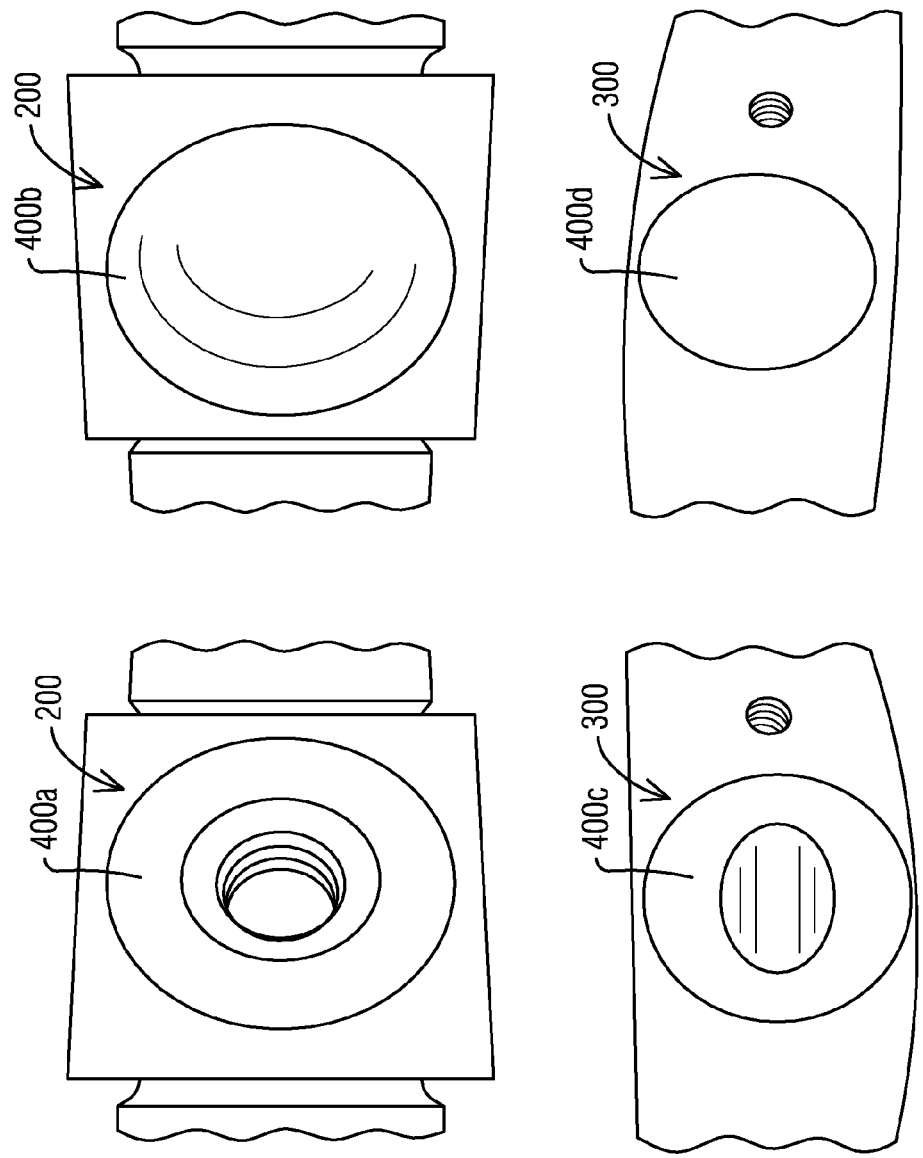
FIG. 3 illustrates a perspective view of interfacing surfaces between a bearing seat and a bearing according to an embodiment.

FIG. 3 illustrates a perspective view of interfacing surfaces 400 between a bearing seat 200 and a bearing 300 according to an embodiment. As illustrated in FIG. 3, the bearing seat 200 may comprise a concave shape interfacing surface 400a and a concave shape interfacing surface 400b. The bearing 300 may comprise a convex shape interfacing surface 400c and a convex shape interfacing surface 400d. The convex shape interfacing surface 400c and the convex shape interfacing surface 400d of the bearing 300 may be mating surfaces to the concave shape interfacing surface 400a and the concave shape interfacing surface 400b of the bearing seat 200, respectively.

According to the illustrated embodiment, the interfacing surfaces 400a, 400b, 400c, and 400d may be spherical shaped. The spherical shaped interfacing surfaces 400 may provide a self-alignment feature of the bearing assembly 100 during generator operation.

During generator operation, a load carried on the spherical shaped interfacing surfaces 400a and 400b of the bearing seat 200 may shift. The shifting of the load may result in a high interfacing surface contact between the bearing seat 200 and the bearing 300, localized galling, and disabling the interfacing surfaces 400 from providing a self-alignment feature of the bearing assembly 100. The issue of the self-alignment of the bearing assembly 100 during operation is identified as a "tilting" of the bearing assembly 100.

The titling issue of the bearing assembly 100 during operation may be resolved by applying a thin slip layer on any one of the interfacing surfaces 400, such as 400a, 400b, 400c, or 400d, to provide a self-lubricating feature between the bearing seat 200 and the bearing 300. The self-lubricating feature between the bearing seat 200 and the bearing 300 will provide a better load distribution carried on the bearing 300.

The thin slip layer is to be applied after using the Blue & Scrape process. However, as discussed in the previous section, the titling issue has repeated a number of times after the Blue & Scrape process have been applied on the interfacing surfaces 400. The Blue & Scrape process may have to be repeated several times which results in 60-100 hours of additional efforts to resolve the titling issue of the bearing assembly 100 during generator operation.

Figure 4:
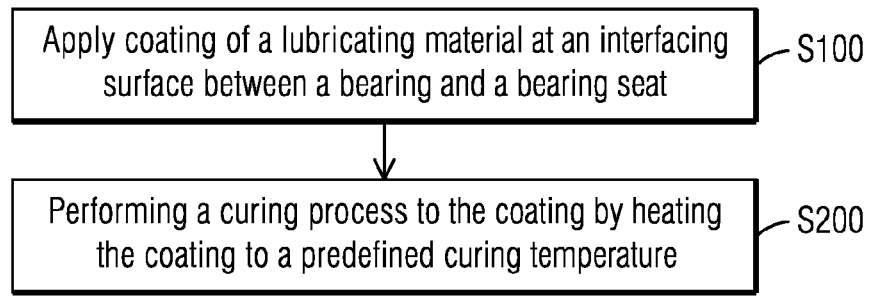
FIG. 4 illustrates a schematic flowchart of a method for lubricating a generator bearing assembly according to an embodiment.

FIG. 4 illustrates a schematic flowchart of a method for lubricating a generator bearing assembly 100 to resolve the titling issue according to an embodiment. As illustrated in FIG. 4, at step S100, a coating of a lubricating material is applied at an interfacing surface 400 between the bearing seat 200 and the bearing 300. At step S200, a curing process is performed at the coating by heating the coating to a predefined curing temperature.

Figure 5:
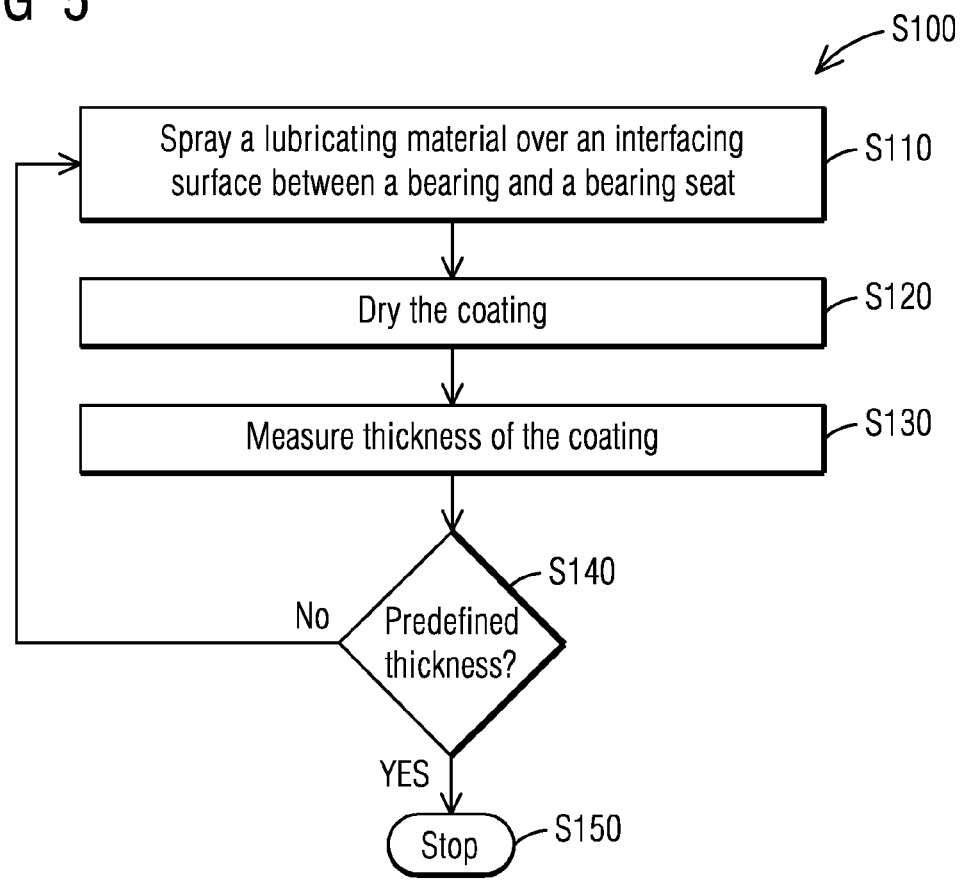
FIG. 5 illustrates a schematic flowchart for applying a coating of a lubricating material at an interfacing surface between a bearing and a bearing seat according to an embodiment.

FIG. 5 illustrates a schematic flowchart of the coating application of step S100 in FIG. 4. As illustrated in FIG. 5, at step S110, a lubricating material is spayed over the interfacing surface 400. The lubricating material may be selected from materials of PTFE (Polytetrafluoroethylene). According to an embodiment, the lubricating material may comprise Teflon™.

According to an embodiment, prior to spraying the lubricating material over the interfacing surface 400, the interfacing surface 400 should be as chemically clean as possible. Grease deposited on the interfacing surface 400 may cause the lubricating material to peel off after it is cured.

According to an embodiment, the coating may be sprayed over the interfacing surface 400 using a spay device, such as a spray gun. The spray device may be held perpendicular to the interfacing surface 400 at a desired distance. Holding the spray device too close to the interfacing surface 400 may cause the coating to look rippled. Holding the spray device too far to the interfacing surface 400 may cause the coating to be dry and rough. According to an embodiment, the spray device may be held perpendicular to the interfacing surface 400 at a distance in a range of 0.15-0.30 m.

As illustrated in FIG. 5, at step S120, a drying process is performed on the coating. According to an embodiment, the coating may be air dried. Dryness of the coating may be checked by touching the coating with a gloved hand.

At step S130 in FIG. 5, a thickness of the coating is measured. According to an embodiment, thickness of a plurality of evenly distributed points along the coating may be measured.

As illustrated in FIG. 5, at step S140, the measured thickness of the coating is compared with a predefined thickness. According to an embodiment, the predefined thickness may be in a range of 0.025±0.010 mm. Coating thinner than 0.015 mm may not be acceptable. Coating thicker than 0.036 mm may be acceptable if the minimum and the maximum thicknesses of the coating differ by less than 0.020 mm. A thicker coating, however, requires more extended time for curing the coating.

Referring to step S140 in FIG. 5, if the measured thickness of the coating does not reach the predefined thickness, steps S110 to S130 are repeated until the predefined thickness is obtained. At step S150, the application of the coating is stopped when the predefined thickness is obtained.

The steps illustrated in the embodiment of FIG. 5 are meant to be of exemplary nature, and hence not limiting.

Figure 6:
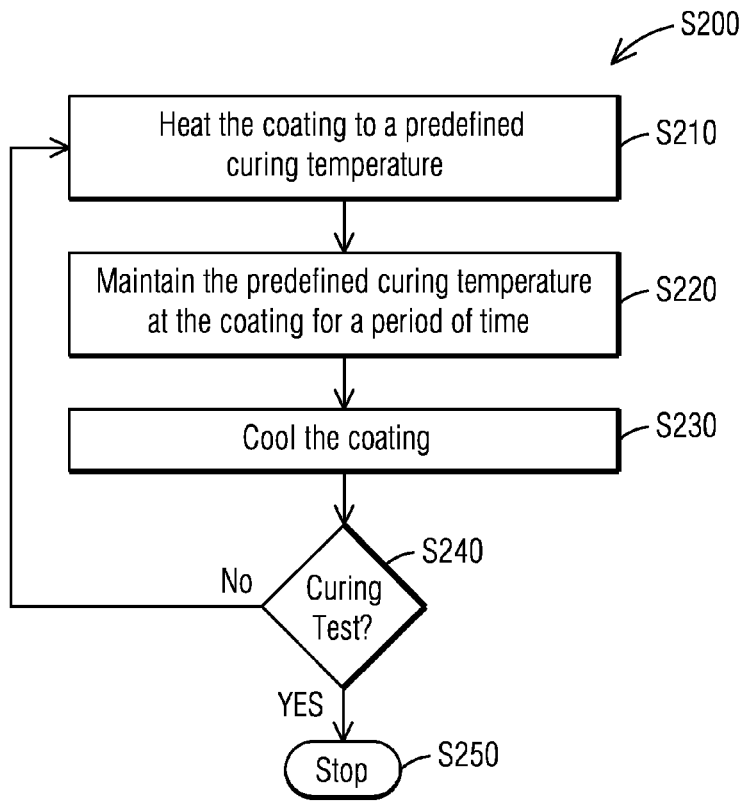
FIG. 6 illustrates a schematic flowchart for performing a curing process to a coating between a bearing and a bearing seat according to an embodiment.

FIG. 6 illustrates an exemplary schematic flowchart of a curing process of step S200 in FIG. 4. As illustrated in FIG. 6, at step S210, the coating is heated to a predefined curing temperature by a heating apparatus. According to an embodiment, the heating apparatus may comprise a furnace. According to an embodiment, the heating apparatus may comprise a portable furnace. According to an embodiment, the heating apparatus may comprise a heat gun. According to an embodiment, the predefined curing temperature for a PTFE material, such as Teflon™, may be in a range of 170° C.-180° C.

At step S220 in FIG. 6, the coating is maintained at the predefined curing temperature for a period of time. According to an embodiment, the coating may be maintained at the predefined curing temperature for thirty minutes.

As illustrated in FIG. 6, at step S230, the coating is cooled after maintained at the predefined curing temperature for the period of the time. According to an embodiment, the coating may be cooled to a room temperature, such as a range of 20° C.

At step S240 in FIG. 6, a curing test is performed at the coating after the coating is cooled. According to an embodiment, a coating may fail the curing test if a surface of the coating is soft or tacky or if it peels off when picked with a fingernail.

Referring to step S240 in FIG. 6, steps S210 to S230 are repeated until the coating passes the curing test. At step S250, the curing process is stopped when the coating passes the curing test.

According to an embodiment, the curing process may be performed by a portable furnace. A trial curing run may be carried out prior to performing the curing process for obtaining a curing setup of the portable furnace. The trial curing run may be carried out on a non-coated test part to verify whether a temperature of the non-coated test part falls within the predefined curing temperature.

According to an embodiment, the curing setup of a portable furnace may comprise an orientation of the portable furnace in relation to a non-coated test part. The curing setup of a portable furnace may comprise a temperature of the portable furnace for applying heat to the non-coated test part to achieve the predefined curing temperature. A curing process to a coating of a bearing assembly 100 may be carried out by the same portable furnace in the trial curing run with the same curing setup.

Figure 7:
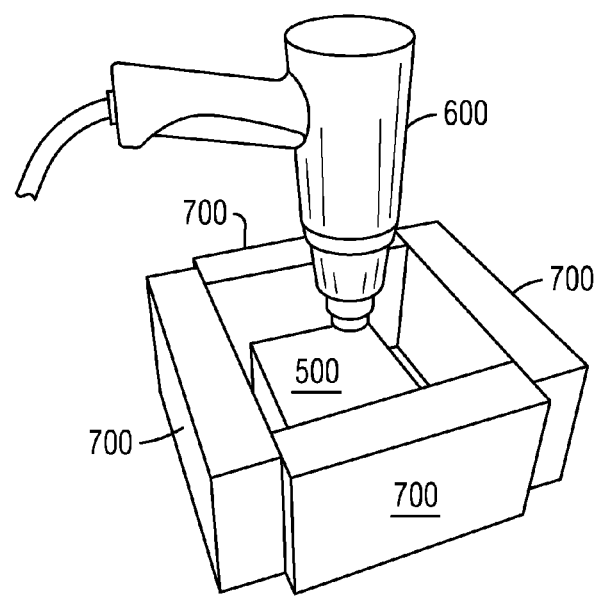
FIG. 7 illustrates a perspective view of a trial curing run setup according to an embodiment.

FIG. 7 illustrates a perspective view of a setup of a trial curing run according to an embodiment. As illustrated in FIG. 7, a non-coated test part 500 is placed on a thermal insulation material 700. A perimeter of the non-coated test part 500 may be surrounded by the thermal insulation material 700. A portable furnace may be held at a distance above the non-coated test part 500 for performing a trial run. According to an embodiment, the portable furnace may comprise a heat gun 600, as illustrated in FIG. 7. An adequately rated heat gun 600 with a proper watt capacity is important for performing the trial curing run. According to an embodiment, a heat gun 600 may have no less than 1200 E-1600 F watt capacity.

Figure 8:
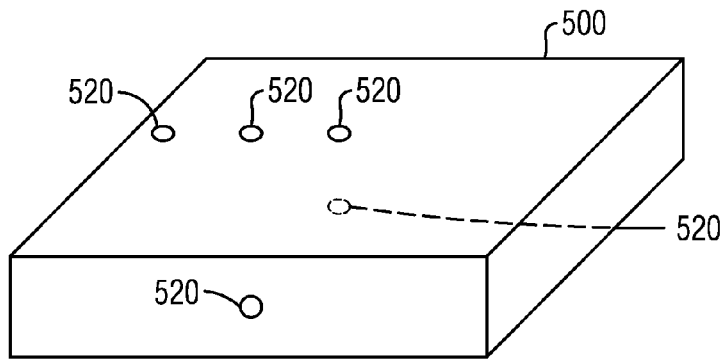
FIG. 8 illustrates a perspective view of a non-coated test part to be used in a trial curing run according to an embodiment.

FIG. 8 illustrates a perspective view of a non-coated test part 500 to be used in a trial curing run according to an embodiment. As illustrated in FIG. 8, the non-coated test part 500 may be a steel test block. The non-coated test part 500 may have a dimension of 209.55 mm×52.32 mm×133.35 mm.

According to an embodiment, a plurality of thermocouples 520 may be arranged at different surfaces of the non-coated test part 500, such as a top surface facing to a heat gun 600, a bottom surface opposite to the top surface facing away to a heat gun 600, side surfaces between the top and the bottom surfaces. According to an embodiment, the thermocouples 520 may be clamped or attached to the surfaces of the non-coated test part 500.

Figure 9:
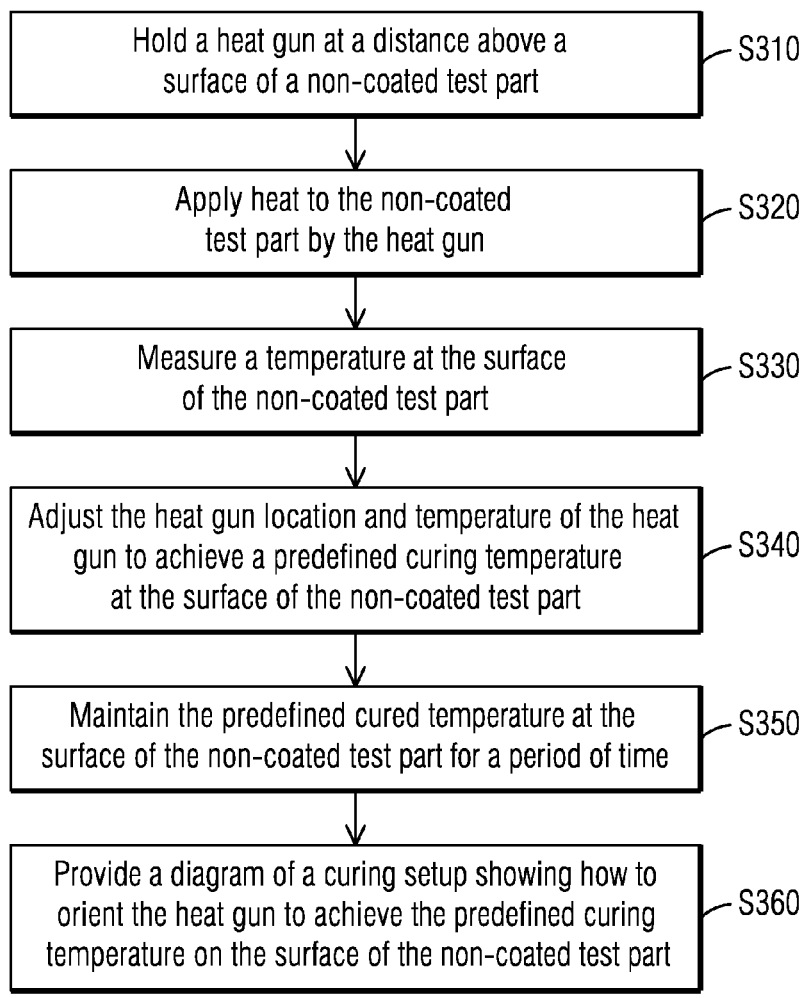
FIG. 9 illustrates a schematic flowchart for performing a trial curing run according to an embodiment.

FIG. 9 illustrates a schematic flowchart for performing a trial curing run according to an example embodiment.

As illustrated in FIG. 9, at step S310, a heat gun 600 may be held at a distance above a surface of a non-coated test part 500. At step S320, heat is applied to the surface of the non-coated test part 500 using the heat gun 600. Temperature at the surface of the non-coated test part 500 facing to the heat gun 600 may be measured at step S330. The temperature may be measured by thermocouples 520 arranged on the surface of the non-coated test part 500 facing to the heat gun 600.

At step S340 in FIG. 9, a distance of the heat gun 600 above the surface of the non-coated test part 500 facing to the heat gun 600 may be adjusted during a trial curing run. A temperature of the heat gun 600 for applying heat to the surface of the non-coated test part 500 facing to the heat gun 600 may be adjusted at step 340. The adjustment is performed for best achieving a predefined curing temperature at the surface of the non-coated test part 500 facing to the heat gun 600.

As illustrated in FIG. 9, at step S350, temperature may be maintained on the surface of the non-coated test part 500 facing to the heat gun 600 for a period of time after it achieves the predefined curing temperature. According to an embodiment, the temperature may be maintained at the predefined curing temperature on the surface of the non-coated test part 500 facing to the heat gun 600 for about 30 minutes. Temperatures at other surfaces of the non-coated test part 500 may be measured during the period of time. The temperatures at these surfaces may be measured by thermocouples 520 arranged on these surfaces of the non-coated test part 500.

As illustrated in FIG. 9, at step S360, a diagram of a curing setup of the heat gun 600 showing how to orient the heat gun 600 to achieve a predefined curing temperature on the surface of the non-coated test part 500 facing to the heat gun 600 0 is generated. The curing setup of the heat gun 600 may comprise a distance of the heat gun 600 above the surface of the non-coated test part 500 facing to the heat gun 600. The curing setup of the heat gun 600 may comprise a temperature of the heat gun 600 for applying heat to the surface of the non-coated test part 500 facing to the heat gun 600. The curing setup of the heat gun 600 may provide an optimal setup for achieving a predefined curing temperature at the surface of the non-coated test part 500 facing to the heat gun 600.

According to an embodiment, a curing process to a coating at an interfacing surface 400 between a bearing seat 200 and a bearing 300 of a bearing assembly 100 may be performed using the same heat gun 600 in the trial curing run with the obtained curing setup of the heat gun 600.

According to an aspect, the illustrated embodiments may provide a thin slip layer to an interfacing surface 400 between a bearing seat 200 and a bearing 300. The thin slip layer may enhance a self-lubricating feature between a bearing seat 200 and a bearing 300. The enhanced self-lubricating feature may provide a better load distribution carrying feature of a bearing seat 200. The better load distribution carrying feature of a bearing seat 200 may resolve a tilted issue of a bearing assembly 100.

According to an aspect, a Teflon™ slip layer may be applied with adhesive sided tape to an interfacing surface 400 between a bearing seat 200 and a bearing 300 to resolve a tilted issue of a bearing assembly 100.

The illustrated embodiments may provide an immediate improve over a titling issue of a bearing assembly 100. According to an aspect, the illustrated embodiments may resolve a titling issue of a bearing assembly 100 in approximately 6 hours of effort, in comparison with 60-100 hours of additional effort using an existing industrial practice, such as repeatedly applying Blue & Scrape process.

According to an aspect, the illustrated embodiments may be performed at a customer site to avoid a titling issue of a bearing assembly 100. The illustrated embodiments may provide a simple solution to resolve the titling issue of the bearing assembly 100 at a customer side.

According to an aspect, a technique of enhancing a self-lubricating feature between a bearing seat 200 and a bearing 300 of a bearing assembly 100, as described in the illustrated embodiments, may be applied to a fleet of the units that use an arrangement of the bearing assembly 100. The reliable results and the simplicity of the illustrated embodiments may significantly reduce maintenance cost of customers for resolving a tilting issue of a bearing assembly 100 of the fleet.

The disclosed method and the apparatus may be implemented to a plurality of different types of power machinery, such as gas turbines, steam turbines, or wind turbines, etc.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

LIST OF REFERENCES

100 Generator Bearing Assembly
200 Bearing Seat
300 Bearing
400 Interfacing Surface between Bearing Seat and Bearing
400a Concave Feature Interfacing Surface on Bearing Seat
400b Concave Feature Interfacing Surface on Bearing Seat
400c Convex Feature Interfacing Surface of Bearing
400d Convex Feature Interfacing Surface of Bearing
500 Non-coated Test Part
520 Thermal Couples
600 Heat Gun
700 Thermal Insulation Material

What is claimed is:

1. A method for aligning between a bearing and a bearing seat of a generator bearing assembly comprising:
    applying a coating of a lubricating material on an interfacing surface between the bearing and the bearing seat, the interfacing surface comprising a concave shape surface portion and a convex shape surface portion of the bearing seat and a convex shape surface portion and a concave shape surface portion of the bearing, the concave shape surface portion of the bearing seat mating with the convex shape surface portion of the bearing and the convex shape surface portion of the bearing seat mating with the concave shape surface portion of the bearing;
    performing a curing process to the coating by heating the coating up to a predefined curing temperature; and
    supporting the bearing on the lubricated concave shape surface portion of the bearing seat and on the lubricated convex shape surface portion of the bearing seat,
    wherein the lubricated concave shape surface portion and the lubricated convex shape surface portion of the bearing seat resolve a shift of a load distribution introduced by weight of the bearing during an operation of the generator to resolve a titling between the bearing and the bearing seat.

2. The method according to claim 1, wherein the lubricating material comprises Polytetrafluoroethylene.

3. The method according to claim 1, wherein the application of the coating comprises:
    spraying the lubricating material over the interfacing surface,
    drying the coating,
    measuring a thickness of the coating, and
    repeating the application of the coating until the thickness of the coating is within a predefined thickness range.

4. The method as claimed in claim 3, wherein the predefined thickness range is 0.025±0.0010 mm.

5. The method according to claim 1, wherein the curing process comprises:
    heating the coating to the predefined curing temperature,
    maintaining the predefined curing temperature at the coating for a predefined period of time,
    cooling the coating,
    performing a curing test, and
    repeating the curing process until the coating passes the curing test.

6. The method according to claim 1, wherein the predefined curing temperature is in a range of 170° C. to 185° C.

7. The method according to claim 1, wherein the curing process is carried out by a portable furnace.

8. The method as claimed in claim 7, further comprising performing a trial curing run on a non-coated test part to obtain a curing setup of the portable furnace, wherein the curing process is carried out by the portable furnace according to the curing setup of the portable furnace.

9. The method as claimed in claim 8, wherein the curing setup of the portable furnace comprises a distance of the portable furnace above a surface of the non-coated test part.

10. The method as claimed in claim 8, wherein the curing setup of the portable furnace comprises a temperature of the portable furnace for applying heat to a surface of the non-coated test part.

11. The method according to claim 1, wherein the curing process is carried out by a heat gun.

12. A generator bearing assembly comprising:
    a bearing; and
    a bearing seat that supports the bearing on an interfacing surface between the bearing and the bearing seat,
    wherein a coating of a lubricating material is applied on the interfacing surface,
    wherein a curing process is performed to the coating by heating the coating up to a predefined curing temperature,
    wherein the interfacing surface comprises a concave shape surface portion and a convex shape surface portion of the bearing seat and a convex shape surface portion and a concave shape surface portion of the bearing,
    wherein the concave shape surface portion of the bearing seat mates with the convex shape surface portion of the bearing and the convex shape surface portion of the bearing seat mates with the concave shape surface portion of the bearing,
    wherein the lubricated concave shape surface portion and the lubricated convex shape surface portion of the bearing seat resolve a shift of a load distribution introduced by weight of the bearing during an operation of the generator to resolve a titling between the bearing and the bearing seat.

13. The generator bearing assembly according to claim 12, wherein the lubricating material comprises Polytetrafluoroethylene.

14. The generator bearing assembly according to claim 12, wherein the application of the coating comprises:
    spraying the lubricating material over the interfacing surface,
    drying the coating,
    measuring a thickness of the coating, and repeating the application of the coating until the thickness of the coating is within a predefined thickness range.

15. The generator bearing assembly according to claim 12, wherein the curing process comprises:
heating the coating to the predefined curing temperature,
maintaining the predefined curing temperature at the coating for a predefined period of time,
cooling the coating,
performing a curing test, and
repeating the curing process until the coating passes the curing test.

16. The generator bearing assembly according to claim 12, wherein the predefined curing temperature is in a range of 170° C. to 185° C.

* * * * *